US009689176B1

(12) United States Patent
Ovitt

(10) Patent No.: US 9,689,176 B1
(45) Date of Patent: Jun. 27, 2017

(54) ANCHORING DEVICE

(71) Applicant: Karen Ovitt, Pittsfield, MA (US)

(72) Inventor: Karen Ovitt, Pittsfield, MA (US)

( * ) Notice: Subject to any disclaimer, the term of this patent is extended or adjusted under 35 U.S.C. 154(b) by 0 days.

(21) Appl. No.: 15/228,504

(22) Filed: Aug. 4, 2016

(51) Int. Cl.
A47B 97/00 (2006.01)
E04H 15/62 (2006.01)
A47G 29/00 (2006.01)
F16B 2/20 (2006.01)

(52) U.S. Cl.
CPC ............ *E04H 15/62* (2013.01); *A47G 29/00* (2013.01); *F16B 2/20* (2013.01)

(58) Field of Classification Search
USPC .......................................... 248/508
See application file for complete search history.

(56) References Cited

U.S. PATENT DOCUMENTS

| 5,101,525 | A | | 4/1992 | Ippolito | |
|---|---|---|---|---|---|
| 5,176,354 | A | | 1/1993 | Feigenbaum, Jr. | |
| 5,474,275 | A | * | 12/1995 | Robertson | E04H 15/62 |
| | | | | | 135/118 |
| 5,524,309 | A | * | 6/1996 | La Barbera | E04H 15/62 |
| | | | | | 135/118 |
| 5,579,798 | A | * | 12/1996 | Pruitt | E04H 15/62 |
| | | | | | 135/118 |
| D382,469 | S | | 8/1997 | Adams | |
| 5,713,383 | A | * | 2/1998 | Ramirez | E04H 15/62 |
| | | | | | 135/118 |
| 5,809,700 | A | * | 9/1998 | Roush | E04H 15/003 |
| | | | | | 135/117 |
| 6,226,813 | B1 | | 5/2001 | Wilburn et al. | |
| 6,631,527 | B2 | | 10/2003 | Hyduk | |
| D492,976 | S | | 7/2004 | Hsu | |
| 6,895,613 | B1 | | 5/2005 | Clouston | |
| 7,159,256 | B1 | * | 1/2007 | Licari | E04H 15/62 |
| | | | | | 135/118 |
| 7,367,859 | B2 | * | 5/2008 | Richardi | B63B 22/16 |
| | | | | | 135/118 |
| 8,997,278 | B1 | * | 4/2015 | Vanvliet | E04H 15/62 |
| | | | | | 135/118 |
| 2002/0007513 | A1 | | 1/2002 | Wilson | |
| 2003/0014925 | A1 | * | 1/2003 | Cox | E04H 15/62 |
| | | | | | 52/23 |
| 2008/0023617 | A1 | * | 1/2008 | Ho | A47G 21/167 |
| | | | | | 248/500 |

(Continued)

*Primary Examiner* — Monica Millner
(74) *Attorney, Agent, or Firm* — Global Intellectual Property Agency, LLC; Daniel Boudwin

(57) ABSTRACT

An anchoring device. The anchoring device provides a clip assembly having a top member and a clip member, wherein the top member and the clip member are removably attachable to one another to form a clasp therebetween. The clip member includes a latch and a pair of protruding members sized to removably engage corresponding apertures disposed on the top member. The latch is pressure sensitive and enables removal of the clip member from the top member when secured thereto. The clip member includes a stake receiving portion having a receptacle and an opening sized to slidably receive a stake therein. The top member includes a ribbed area for receiving a corresponding ribbed member pivotally attached to the clip member, wherein the ribbed area and ribbed member form the clasp. The ribbed member includes a tab for vertically flexing the ribbed member to clasp the clip assembly onto an object.

20 Claims, 6 Drawing Sheets

(56) References Cited

U.S. PATENT DOCUMENTS

2014/0339393 A1\* 11/2014 Ovitt ................. E04H 15/62
                                                          248/500
2015/0041612 A1\* 2/2015 Kaplan ............... E04H 15/64
                                                          248/508

\* cited by examiner

ANCHORING DEVICE

BACKGROUND OF THE INVENTION

The present invention relates to anchoring devices. More specifically, the present invention relates to an improved anchoring device having a clip assembly with a removably attachable clip member configured to slidably receive a stake for utilizing the clip assembly to hold a towel or blanket either with or without a stake.

Although beachgoers often use towels to dry themselves off after being in the water, the chief purpose of a beach towel or blanket is to provide a surface on which an individual may lie on or a surface on which an individual may rest a wet area of his or her body on. Beach towels and blankets, however, do not stay in place during high winds that commonly occur at the beach. Therefore, beach towels tend to shift and bunch up during use, thereby subjecting an individual to the uncomfortable underlying sand or the ground.

The use of anchoring devices for holding objects is known in the prior art. More specifically, anchoring devices for holding towel and blankets heretofore devised and utilized are known to consist basically of familiar, expected, and obvious structural configurations, notwithstanding the myriad of designs encompassed by the crowded prior art which have been developed for the fulfillment of countless objectives and requirements.

SUMMARY OF THE INVENTION

In view of the foregoing disadvantages inherent in the known types of anchoring devices now present in the prior art, the present invention provides an improved anchoring device wherein the same can be utilized for securing a towel, blanket, or garment to the ground or an object. The present invention provides an anchoring device, comprising: a stake; a clip assembly comprising: a top member having a pair of opposing apertures, an opening, and a ribbed area; a clip member, comprising: a planar portion having a front end and a rear end; a stake-receiving portion disposed on the planar portion, the stake-receiving portion having a receptacle with an opening sized to receive the stake therethrough; a pair of opposing arms, each having a protruding member; a latch; a ribbed member having a plurality of ribs and a tab; wherein the apertures of the top member are sized to removably receive the protruding members of the opposing arms and the opening of the top member is sized to removably engage the latch of the of the clip member, thereby forming a connection between the top member and clip member; and wherein the ribbed area of the top member is configured to engage the ribbed member of the clip member when the clip member is secured to the top member.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
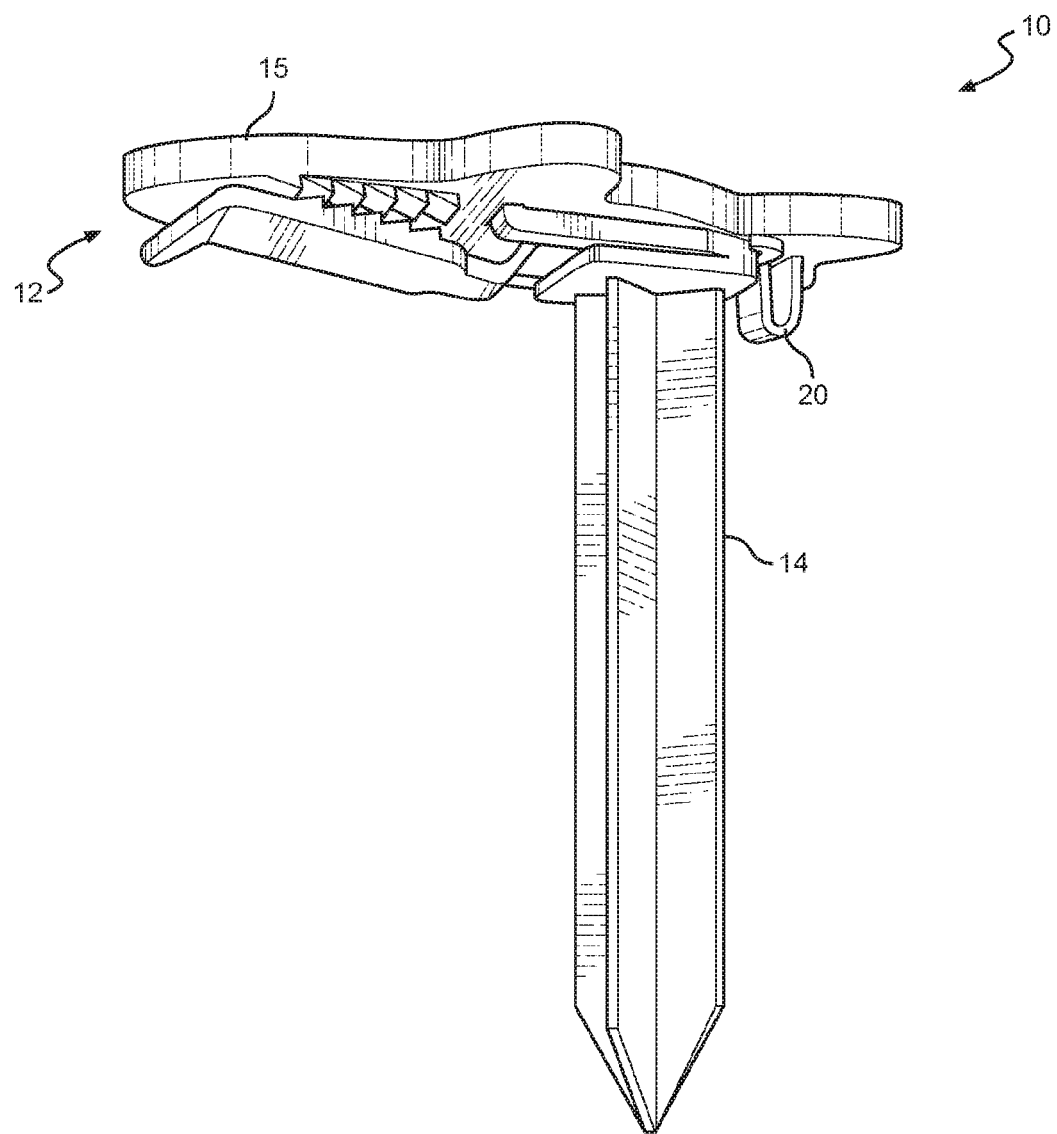
FIG. 1A shows a perspective view of the anchoring device in closed configuration.

Reference is made herein to the attached drawings. Like reference numerals are used throughout the drawings to depict like or similar elements of the anchoring device. The figures are intended for representative purposes only and should not be considered to be limiting in any respect.

Figure 1B:
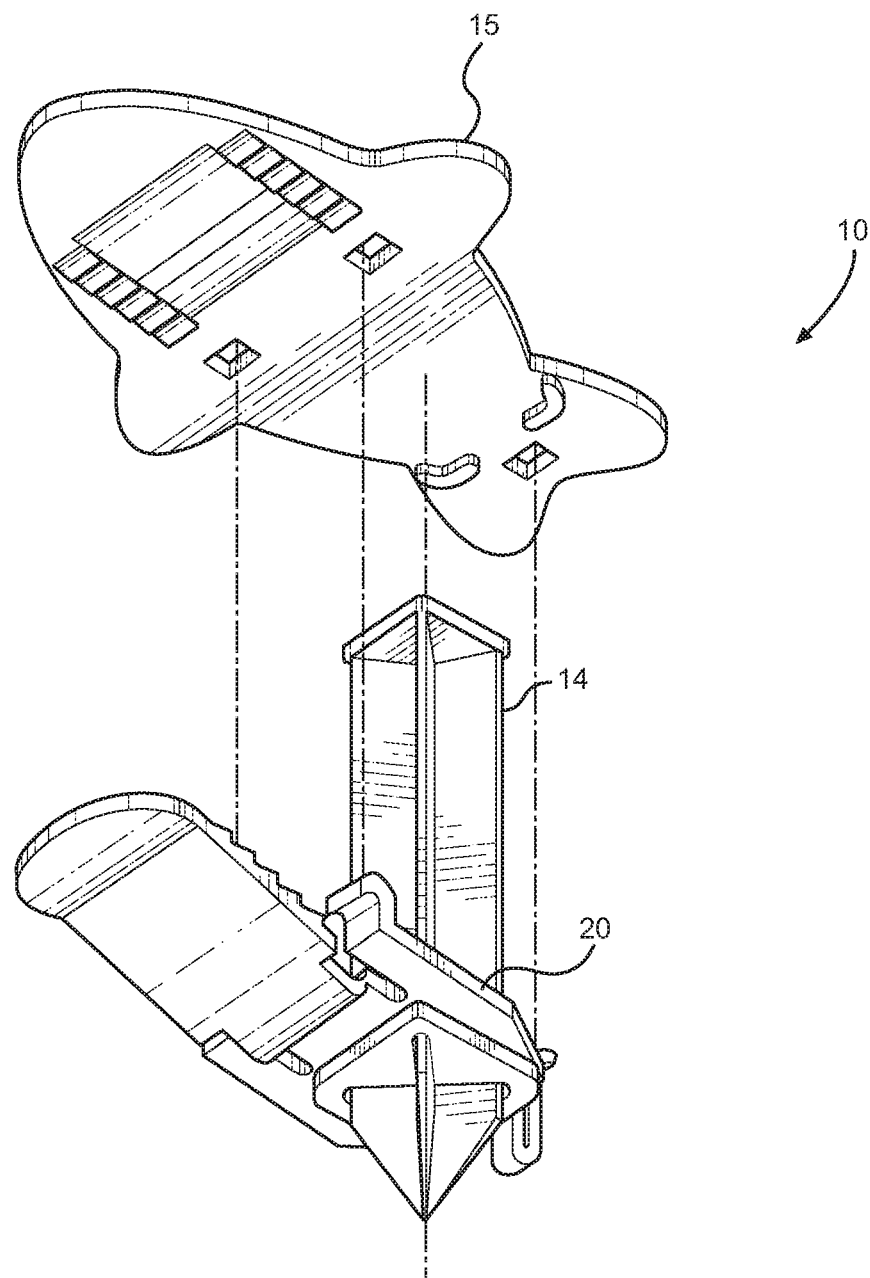
FIG. 1B shows an exploded perspective view of the anchoring device.

Referring now to FIGS. 1A and 1B, there are shown views of the anchoring device. The anchoring device 10 comprises a clip assembly 12 configured to removably receive a stake 14 therethrough, such that a user may utilize the clip assembly 12 to secure a towel, blanket, and/or garment to an object or the ground either with or without the support of the stake 14. The clip assembly 12 comprises a top member 15 and a clip member 20 configured to removably attach to one another. The clip assembly 12 has two configurations: an open configuration wherein the top member 15 and clip member 20 are disengaged and detached from one another and a closed configuration wherein the top member 15 and clip member 20 are engaged and attached to one another.

The top member 15 comprises apertures and an opening corresponding to protruding members and a latch, respectively, on the clip member 20 for removably engaging the members 15, 20 into either open or closed configuration. The top member 15 comprises a ribbed area corresponding to a ribbed member disposed on the clip member 20, wherein the ribbed area and the ribbed member interact when in closed configuration to form a clasp for clasping a towel, blanket, and/or garment, and securing them thereto. This interaction occurs in closed configuration because, when the clip member 20 is attached to the top member 15, the ribbed member of the clip member 20 is biased towards the ribbed area of the top member 15, such that the ribbed member applies an upward vertical force onto the ribbed area. The clip member 20 comprises a stake receiving portion sized and dimensioned to slidably receive the stake 14 therein, such that the clip assembly may be moved into closed configuration either with or without the stake. In one embodiment, the stake is substantially cruciform in shape.

Figure 2A:
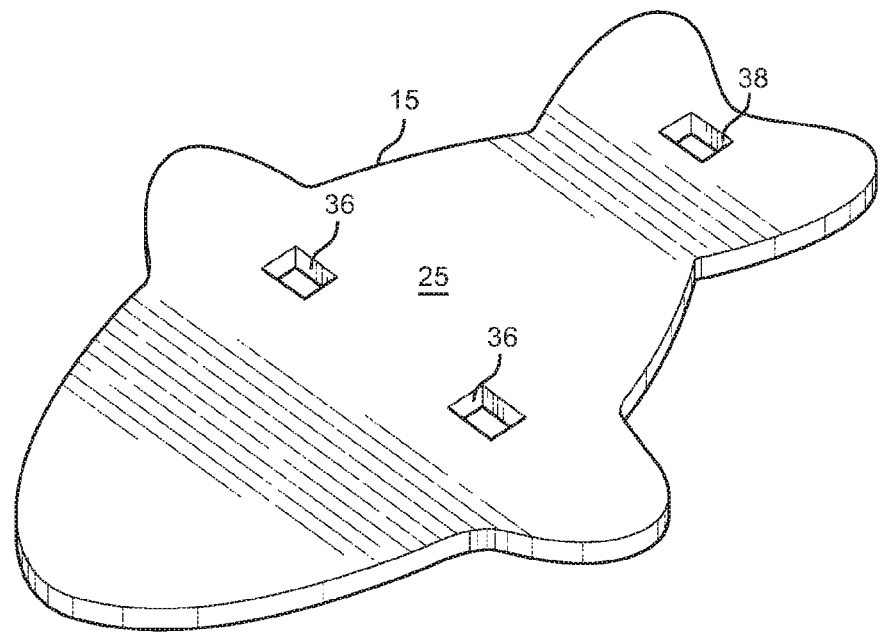
FIG. 2A shows a top perspective view of the top member of the clip assembly.
Figure 2B:
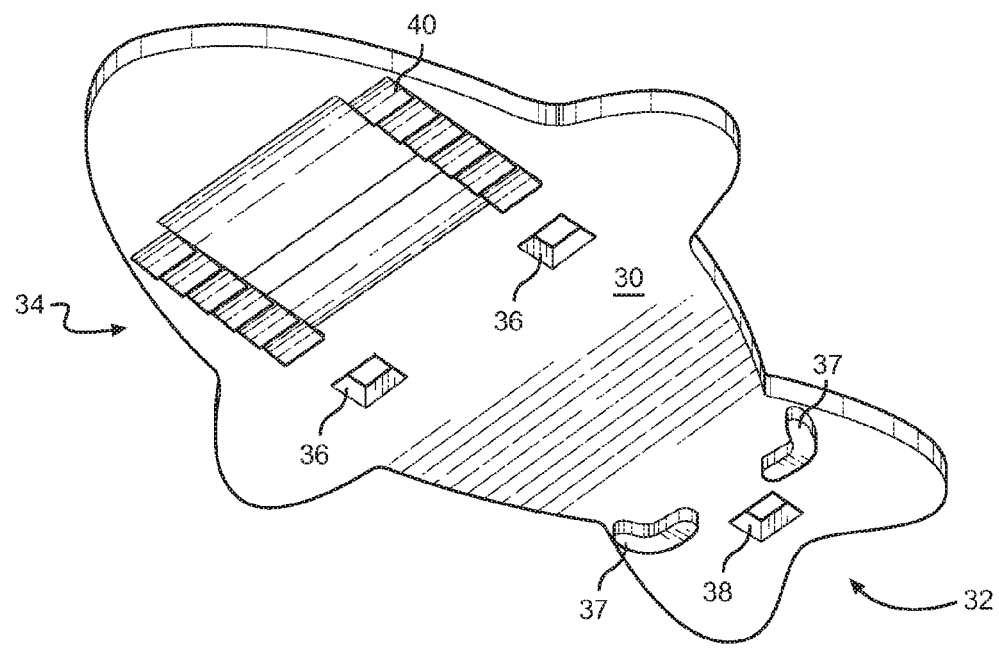
FIG. 2B shows a bottom perspective view of the top member of the clip assembly.

Referring now to FIGS. 2A and 2B, there are shown views of the top member of the clip assembly. The top member 15 of the clip assembly is planar and comprises a flat upper surface 25 and a lower surface 30. In the depicted embodiment, the top member 15 is fish-shaped; however, in alternative embodiments, the top member 15 may be sandal-shaped, circular-shaped, oval-shaped, or have any other shape. As the upper surface 25 is planar, objects, such as a water bottle, a cup, or a bottle of sunscreen can be rested thereon when the present anchoring device is placed such that the upper surface 25 is level. The top member 15 further comprises a pair of opposing apertures 36, wherein the apertures 36 are sized to receive corresponding protruding members disposed on the clip member, such that the clip member may be secured to the top member 15. In the depicted embodiment, the apertures 36 are positioned approximately centrally on the top member 15, spaced apart from one another, and aligned. In one embodiment, the apertures comprise square holes extending through the lower surface 30 to the upper surface 25 of the top member 15, thereby forming holes therethrough.

The top member 15 further comprises an opening 38 disposed on a first end 32 of the lower surface 30, sized to receive a corresponding latch disposed on the clip member 20, such that the latch may further facilitate the securement of the clip member 20 to the top member 15. In one embodiment, the opening comprises a square hole extending through the lower surface 30 to the upper surface 25 of the top member 15, thereby forming a hole therethrough. A second end 34 of the lower surface 30 comprises a ribbed area 40 that corresponds to a ribbed member disposed on the clip member. In the depicted embodiment, the ribbed area 40 comprises a pair of aligned, raised ribbed strips that form a space therebetween that is sized to receive the ribbed member of the clip member. In one embodiment, the lower surface 30 of the first end 32 further comprises a pair of opposing flanges 37 that are each configured to engage a corner of a rear end of the clip member. The flanges 37 restrict the movement of the clip assembly when secured to the top member 15, further assisting in securing the clip member to the top member 15.

Figure 3A:
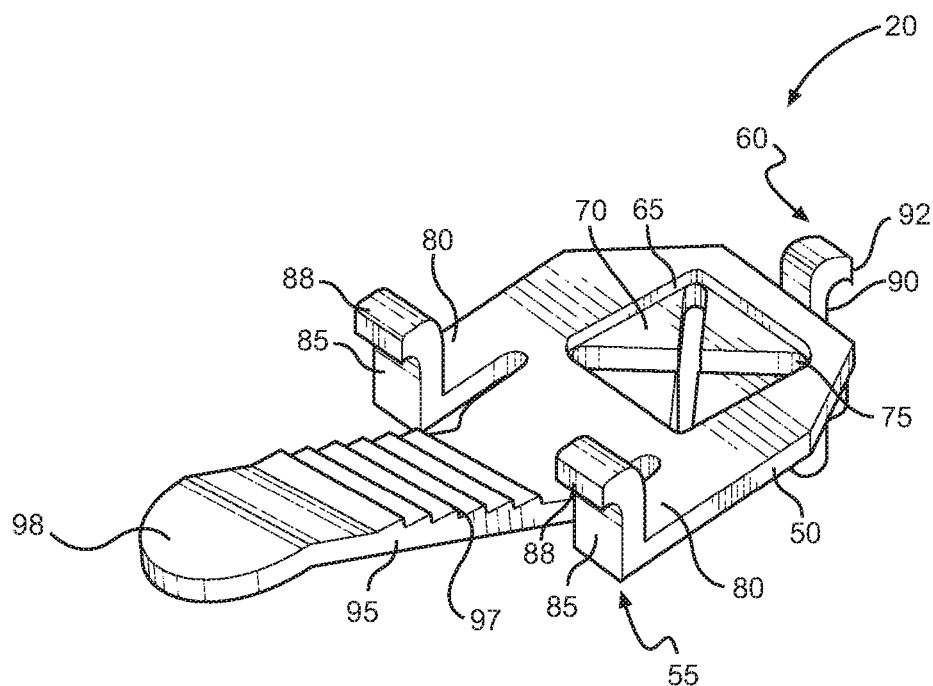
FIG. 3A shows a top perspective view of the clip member of the clip assembly.
Figure 3B:
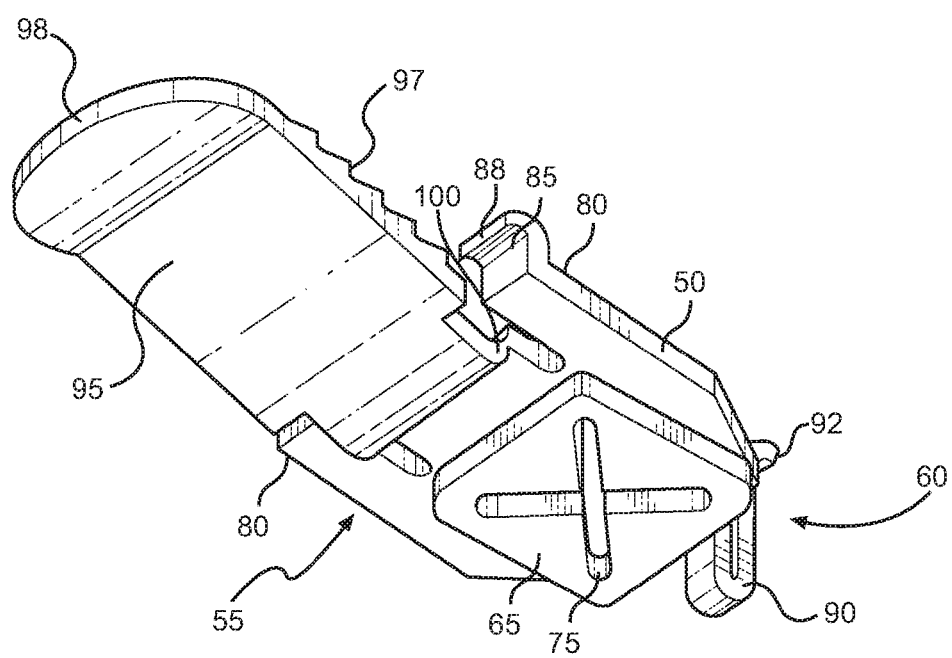
FIG. 3B shows a bottom perspective view of the clip member of the clip assembly.

Referring now to FIGS. 3A and 3B, there are shown top and bottom views of the clip member of the clip assembly, respectively. The clip member 20 of the clip assembly comprises a planar portion 50 having a front end 55 and a rear end 60. The clip member 20 further comprises a stake receiving portion 65, wherein the stake receiving portion 65 is centrally disposed on the planar portion 50. The stake receiving portion 65 comprises a receptacle 70 having an interior volume sized to receive the top portion of stake flush therein. The receptacle further comprises an opening 75 disposed at the bottom of the interior volume that is sized and configured to slidably receive the stake of the anchoring device therein. In the depicted embodiment, the receptacle 70 is rectangular in shape and the opening 75 is substantially cruciform in shape, such that the stake receiving portion 65 is sized to slidably receive a cruciform-shaped stake flush therein.

The clip member 20 further comprises a pair of opposing arms 80 disposed on the front end 55 of the planar portion 50 that extend horizontally therefrom. Each arm 80 comprises a protruding member 85 disposed at its end that is in perpendicular orientation relative to its corresponding arm 80. The protruding members 85 correspond to the opposing apertures disposed on the top member and are sized to fit in their corresponding apertures such that the clip member 20 may be removably attached to the top member. The protruding members 85 comprise a fixed body having a flange 88 disposed at a distal end thereof that is configured to bear against the perimeter of their corresponding apertures when the protruding members 85 are inserted therethrough.

The clip member 20 further comprises a latch 90 disposed on the rear end 60 of the planar portion 50. In an illustrative embodiment of the clip assembly, the latch 90 includes a flexible body projecting from the rear end 60 of the clip member 20 that is insertable into the opening disposed on the top member. The latch 90 includes a flange 92 disposed at a distal end of the flexible body that is configured to bear against the perimeter of the opening when the latch 90 is inserted therethrough. The latch 90 is biased to snap into engagement with the opening. In conjunction with the protruding members 85, the latch 90 can be disengaged therefrom by pressing on the flexible body of the latch 90, causing the flange 92 to disengage from the opening.

The clip member 20 further comprises a ribbed member 95 flexibly attached to the front end 55 of the planar portion 50 that protrudes upwardly at an obtuse angle relative to the planar portion 50. The ribbed member 95 is biased towards the top member when the top member and the clip member 20 are connected. In the depicted embodiment, the ribbed member 95 is flexible attached to the front end 55 via a curved portion 100, which is connected to the front end 55 about a living hinge. The pivotal attachment to the front end 55, enables the ribbed member 95 to flex vertically relative to the horizontal plane of the planar portion 50. In the depicted embodiment, the ribbed member 95 comprises a plurality of ribs 97 extending laterally across the ribbed member 95 and a tab 98 disposed at an end thereof. The ribs 97 are configured to engage with the corresponding ribbed area on the top member.

When the clip member 20 is attached to the top member, i.e., when the anchoring device is moved into closed configuration, the ribbed area of the top member and the ribbed member of the clip member engage to secure a towel, blanket, or other garment therebetween. In the depicted embodiment, the tab 98 is angled downwardly relative to the ribbed member 95 in order to facilitate grasping of the ribbed member 95. The upward protrusion of the ribbed member 95 makes it biased towards the top member, thus when the clip member 20 is joined to the top member, the ribbed member 95 exerts and upward vertical force onto the corresponding ribbed area of the top member. The tab 98 enables a user to grasp the ribbed member 95 and flex it downwardly relative to the top member, thereby opening the clip member 20 and enabling a user to insert a towel, blanket, or garment therein.

Figure 4A:
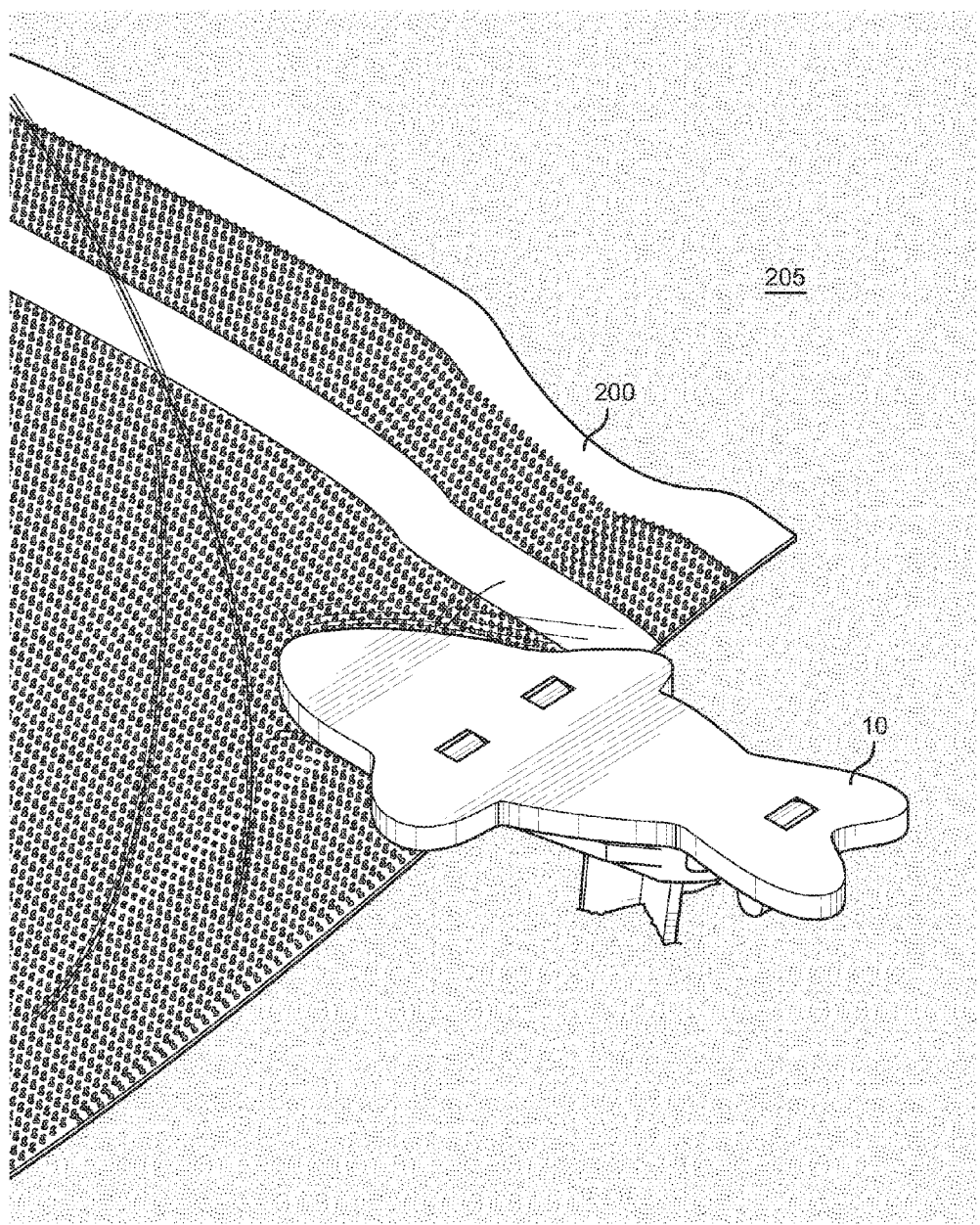
FIG. 4A shows a perspective view of the anchoring device in use with the stake.
Figure 4B:
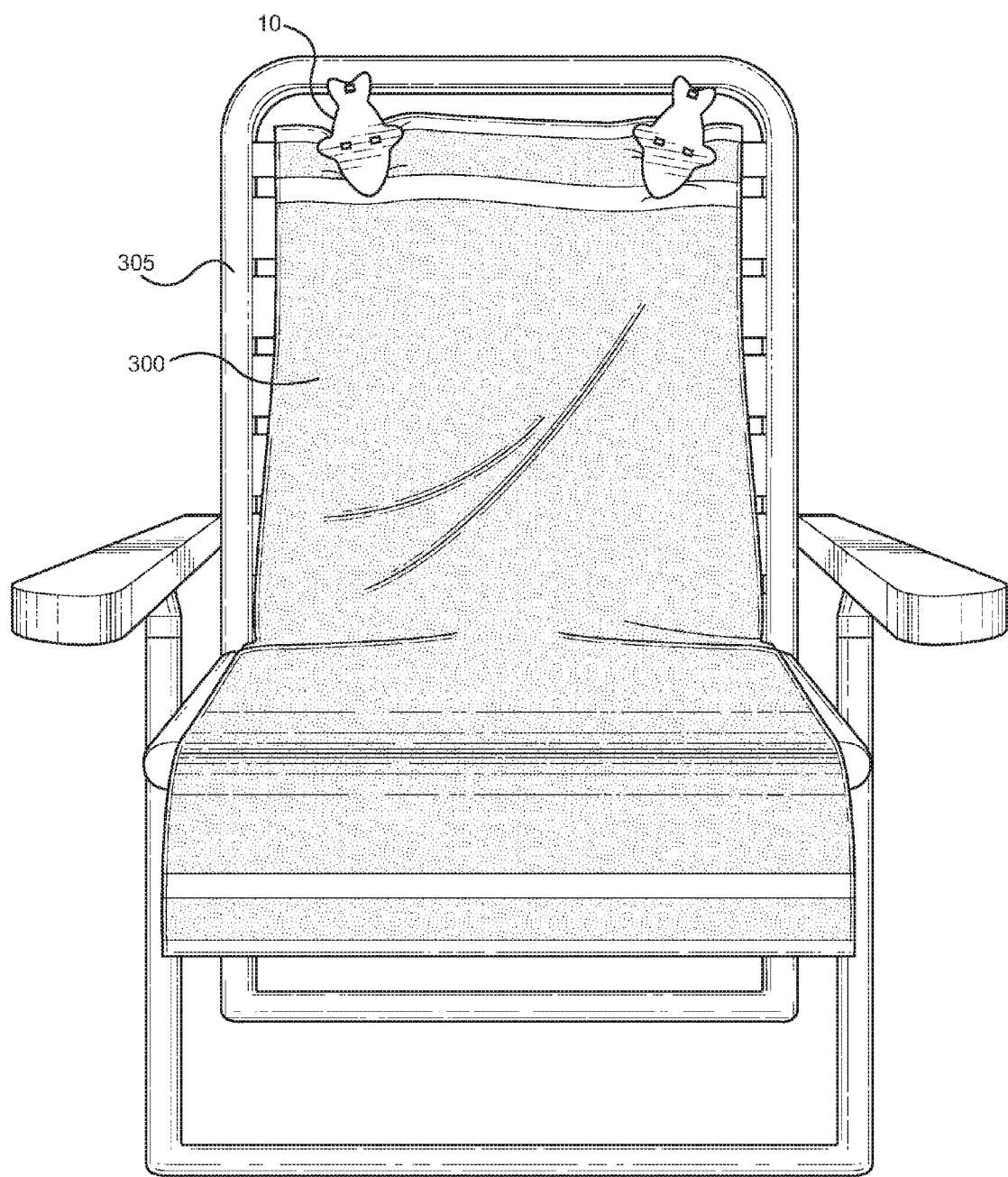
FIG. 4B shows a perspective view of the anchoring device in use without the stake.

Referring now to FIGS. 4A and 4B, there are shown views of the anchoring device in use. In one use, the anchoring device 10 may be employed to hold a beach towel 200 down onto the surface of the sand 205. In another use, the anchoring device 10 may be employed to secure a beach towel 300 to the back rest of a beach chair 305. In utilizing the anchoring device 10 to hold a beach towel down, a user first moves the anchoring device 10 into open configuration by disengaging the top member and clip member. The user then inserts the stake 20 into the opening of the stake receiving portion of the clip member until the stake rests flush with the receptacle thereof. The user then moves the anchoring device 10 into closed configuration by engaging the clip member and the top member via the protruding members and latch. Once engaged, the user then opens the clasp of the clip assembly via the tab disposed on the ribbed member, inserts a corner of a towel therein, and lets the tab go, thereby securing the towel thereto. The user then drives the stake into the ground thereby securing the anchoring device and the towel to the ground. To utilize the anchoring device to secure a towel to the back rest of a beach chair, the user moves the anchoring device into open configuration, removes the stake, and moves the anchoring device back into closed configuration. The user may then use the clasp to clip the clip assembly onto the back rest of a chair an insert a towel therein, thereby securing the towel in the clasp and to the chair.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anchoring device, comprising:
   a stake;
   a clip assembly comprising:
      a top member having a pair of opposing apertures, an opening, and a ribbed area;
      a clip member, comprising:
         a planar portion having a front end and a rear end;
         a stake-receiving portion disposed on the planar portion, the stake-receiving portion having a receptacle with an opening sized to receive the stake therethrough;
         a pair of opposing arms, each having a protruding member;
         a latch;
         a ribbed member having a plurality of ribs and a tab;
      wherein the apertures of the top member are sized to removably receive the protruding members of the opposing arms and the opening of the top member is sized to removably engage the latch of the of the clip member, thereby forming a connection between the top member and clip member; and
      wherein the ribbed area of the top member is configured to engage the ribbed member of the clip member when the clip member is secured to the top member.

2. The anchoring device of claim 1, wherein the top member is planar and comprises a flat upper surface and a lower surface.

3. The anchoring device of claim 1, wherein the pair of opposing apertures are centrally disposed on the top member.

4. The anchoring device of claim 1, wherein the opening is disposed at a first end of the top member.

5. The anchoring device of claim 1, wherein the ribbed area is disposed at a second end of the top member.

6. The anchoring device of claim 1, wherein the ribbed area comprises two opposing raised ribbed strips forming a space therebetween, the space sized to receive the ribbed member.

7. The anchoring device of claim 1, wherein the receptacle of the stake-receiving portion is comprises an interior volume sized to receive a top portion of a stake flush therein.

8. The anchoring device of claim 1, wherein the opening of the receptacle of the stake-receiving portion is cruciform in shape.

9. The anchoring device of claim 1, wherein the latch is disposed at the rear end of the planar portion.

10. The anchoring device of claim 1, wherein the pair of opposing arms are disposed at the front end of the planar portion and extend horizontally therefrom.

11. The anchoring device of claim 10, wherein the protruding members are disposed at ends of the opposing arms and extend perpendicularly therefrom.

12. The anchoring device of claim 11, wherein the protruding members each comprise a flange at a distal end thereof.

13. The anchoring device of claim 1, wherein the latch comprises a flexible body projecting from the rear end of the planar portion, the flexible body having a flange disposed at a distal end thereof.

14. The anchoring device of claim 1, wherein the ribbed member is flexibly attached to the front end of the planar portion.

15. The anchoring device of claim 14, wherein the ribbed member is flexibly attached about a living hinge.

16. The anchoring device of claim 15, wherein the ribbed member extends from the planar portion at an obtuse angle relative thereto.

17. The anchoring device of claim 1, wherein the ribbed member is biased towards the top member when the clip member is attached to the top member.

18. The anchoring device of claim 1, wherein the plurality of ribs extending laterally across the ribbed member and the tab is disposed at an end thereof.

19. The anchoring device of claim 1, wherein the stake is cruciform in shape.

20. The anchoring device of claim 1 wherein the stake includes a flat upper end sized to fit flush inside of the receptacle of the stake-receiving portion.

* * * * *